United States Patent
Trossman et al.

(10) Patent No.: US 8,516,086 B2
(45) Date of Patent: *Aug. 20, 2013

(54) GENERALIZED CREDENTIAL AND PROTOCOL MANAGEMENT OF INFRASTRUCTURE

(75) Inventors: Andrew N. Trossman, North York (CA); Gabriel Iszlai, Toronto (CA); Michael L. Y. Li, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/462,370

(22) Filed: May 2, 2012

(65) Prior Publication Data

US 2012/0216264 A1    Aug. 23, 2012

Related U.S. Application Data

(63) Continuation of application No. 10/947,768, filed on Sep. 23, 2004, now Pat. No. 8,219,648.

(30) Foreign Application Priority Data

Sep. 26, 2003   (CA) ...................................... 2442799

(51) Int. Cl.
*G06F 15/177* (2006.01)

(52) U.S. Cl.
USPC ........... 709/220; 719/320; 719/331; 719/332; 705/348; 705/7.11; 726/17

(58) Field of Classification Search
None
See application file for complete search history.

(56) References Cited

U.S. PATENT DOCUMENTS

| | | | |
|---|---|---|---|
| 5,734,837 | A | 3/1998 | Flores et al. |
| 5,781,724 | A | 7/1998 | Nevarez et al. |
| 5,960,404 | A | 9/1999 | Chaar et al. |
| 5,995,100 | A | 11/1999 | Auslander |
| 6,035,264 | A | 3/2000 | Donaldson et al. |
| 6,041,306 | A * | 3/2000 | Du et al. ...................... 705/7.26 |
| 6,073,109 | A | 6/2000 | Flores et al. |
| 6,134,580 | A | 10/2000 | Tahara et al. |
| 6,223,292 | B1 | 4/2001 | Dean et al. |
| 6,374,207 | B1 | 4/2002 | Li et al. |
| 6,430,597 | B1 | 8/2002 | Dilip et al. |
| 6,519,642 | B1 * | 2/2003 | Olsen et al. ................... 709/227 |
| 6,948,170 | B2 | 9/2005 | Izumi |
| 6,975,914 | B2 | 12/2005 | DeRemer et al. |
| 6,996,844 | B2 | 2/2006 | Langford et al. |
| 7,047,535 | B2 | 5/2006 | Lee et al. |
| 7,055,067 | B2 | 5/2006 | DiJoseph |

(Continued)

OTHER PUBLICATIONS

United States Patent and Trademark Office, Office Action for U.S. Appl. No. 10/947,768, May 2, 2008, pp. 1-11, Alexandria, VA, USA.

(Continued)

*Primary Examiner* — Greg C Bengzon
(74) *Attorney, Agent, or Firm* — Lee Law, PLLC; Christopher B. Lee

(57) ABSTRACT

A workflow request having a set of device specific operations and credentials is obtained. The workflow request is parsed to locate at least one of the set of device specific operations and credentials. The located device specific operations and credentials are replaced with at least one logical device operation and logical credentials to create a generalized credential and protocol workflow.

12 Claims, 8 Drawing Sheets

(56) References Cited

U.S. PATENT DOCUMENTS

| | | |
|---|---|---|
| 7,174,361 B1 | 2/2007 | Paas |
| 7,213,209 B2 | 5/2007 | Lueckhoff et al. |
| 7,356,601 B1 * | 4/2008 | Clymer et al. ............. 709/229 |
| 7,363,377 B1 | 4/2008 | Alban et al. |
| 7,386,586 B1 | 6/2008 | Headley et al. |
| 7,562,339 B2 | 7/2009 | Racca et al. |
| 7,778,717 B2 | 8/2010 | Bachman et al. |
| 7,827,595 B2 | 11/2010 | Gociman |
| 2002/0004824 A1 | 1/2002 | Cuan et al. |
| 2002/0032692 A1 | 3/2002 | Suzuki et al. |
| 2002/0075293 A1 | 6/2002 | Charisius et al. |
| 2002/0129149 A1 | 9/2002 | Schulz |
| 2002/0143865 A1 | 10/2002 | Tung Loo et al. |
| 2002/0161823 A1 * | 10/2002 | Casati et al. ............. 709/202 |
| 2003/0126194 A1 * | 7/2003 | Kase et al. ............. 709/202 |
| 2003/0236838 A1 * | 12/2003 | Ouchi ............. 709/205 |
| 2004/0041827 A1 | 3/2004 | Bischof et al. |
| 2004/0177073 A1 | 9/2004 | Snyder et al. |
| 2004/0199399 A1 | 10/2004 | Sugiyama |
| 2005/0010919 A1 | 1/2005 | Ramanathan et al. |
| 2005/0055348 A1 | 3/2005 | Deimel et al. |
| 2008/0016232 A1 | 1/2008 | Yared et al. |
| 2008/0306746 A1 | 12/2008 | Racca et al. |
| 2011/0153051 A1 | 6/2011 | Bachman et al. |

OTHER PUBLICATIONS

United States Patent and Trademark Office, Office Action for U.S. Appl. No. 10/947,768, Sep. 17, 2008, pp. 1-17, Alexandria, VA, USA.

United States Patent and Trademark Office, Advisory Action for U.S. Appl. No. 10/947,768, Dec. 9, 2008, pp. 1-8, Alexandria, VA, USA.

United States Patent and Trademark Office, Examiner's Answer for U.S. Appl. No. 10/947,768, May 28, 2009, pp. 1-22, Alexandria, VA, USA.

United States Patent and Trademark Office, Decision on Appeal for Appeal No. 2009-014611 (U.S. Appl. No. 10/947,768), Dec. 16, 2011, pp. 1-8, Alexandria, VA, USA.

United States Patent and Trademark Office, Notice of Allowance for U.S. Appl. No. 10/947,768, Mar. 5, 2012, pp. 1-11, Alexandria, VA, USA.

* cited by examiner

GENERALIZED CREDENTIAL AND PROTOCOL MANAGEMENT OF INFRASTRUCTURE

RELATED APPLICATIONS

This application is a continuation of and claims priority to and claims the benefit of U.S. patent application Ser. No. 10/947,768, titled "GENERALIZED CREDENTIAL AND PROTOCOL MANAGEMENT OF INFRASTRUCTURE," which was filed in the U.S. Patent and Trademark Office on Sep. 23, 2004, and has a current status of allowed, and which also claims priority to and claims the benefit of Canadian Patent Application No. 2,442,799, titled "GENERALIZED CREDENTIAL AND PROTOCOL MANAGEMENT OF INFRASTRUCTURE," which was filed in the Canadian Intellectual Property Office on Sep. 26, 2003, both of which are incorporated herein by reference in their entireties.

BACKGROUND

This present invention relates generally to managing infrastructure such as that of a computerized data processing system and more particularly to generalized credential and protocol management of infrastructure in a computerized data processing system.

Managing multiple business applications in a computerized data processing system or computerized data center involves the interaction of numerous systems, devices and software comprising the infrastructure. Each of these systems, devices and software may have differing associated protocols and credentials required for their management, adding to the complexity of that infrastructure. Due to the complexity of the infrastructure, automated procedures are desirable to manage the overall data center.

Automation has a requirement to handle both the protocols and credentials of the components of the data center infrastructure in order to be effective. In addition the handling of protocols and credentials in a centralized manner as required by automation places the information at risk. The notion of a single point of failure or compromise introduces a security risk that must be addressed.

Typically automated systems would have control files including information such as user IDs and associated passwords related to resources under management control. If such control files were compromised in any way that information would no longer be secure or trusted. In many cases the information that was collected was located in a single place for more effective use by the management systems. However this centralization placed additional responsibility on the administrators of the system to carefully use and protect the data against unauthorized use.

Therefore what is required is a more cost effective way to manage the infrastructure while addressing the security needs of a computerized data center.

BRIEF SUMMARY

A method, system and program product for generalized credential and protocol management of infrastructure in a computerized data processing system is provided. A workflow is first parsed to locate device specific operation requests and such specifications are then replaced with logical equivalents. The resulting workflow is then generalized with respect to both credentials and protocol. Later the generalized credentials and protocol workflow request is combined with metadata resolving the logical device operations and credentials into a modified workflow request which is executed. The separation of the credentials until just before execution keeps the workflow secure and allows flexibility in deciding where to run the workflow. The logical device operations also provide increased flexibility in executing a workflow over physical devices as the characteristics of the workflow may be altered just prior to running the workflow to suit the target devices. One form of alteration is the inheritance of operation specifications from other workflows.

In one aspect of the present invention, a method is provided for generalized credential and protocol management of infrastructure in a computerized data processing system. The method comprises the steps of obtaining a workflow request having a plurality of device specific operations and credentials therefor; parsing the workflow request to locate at least one of the plurality of device specific operations and credentials therefor; and replacing the located at least one of the device specific operations and credentials therefor with an at least one logical device operation and logical credentials to create a generalized credential and protocol workflow.

In another embodiment of the invention, a computer system is provided for generalized credential and protocol management of infrastructure in a computerized data processing system. The computer system comprises retrieving means to obtain a workflow request having a plurality of device specific operations and credentials therefor; parsing means to parse the workflow request to locate at least one of the plurality of device specific operations and credentials therefor; and replacing means to replace the located at least one of the device specific operations and credentials therefor with an at least one logical device operation and credentials to create a generalized credential and protocol neutral workflow.

In another embodiment of the invention, a computer program product is provided that includes a computer readable medium tangibly embodying computer readable program code for instructing a computer to perform a method for generalized credential and protocol management of infrastructure in a computerized data processing system. The implemented method steps comprise obtaining a workflow request having a plurality of device specific operations and credentials therefor; parsing the workflow request to locate at least one of the plurality of device specific operations and credentials therefor; and replacing the located at least one of said device specific operations and credentials therefor with an at least one logical device operation and credentials to create a generalized credential and protocol workflow.

In another embodiment of the invention, there is provided a signal bearing medium having a computer readable signal tangibly embodying computer readable program code for instructing a computer to perform the method for generalized credential and protocol management of infrastructure in a computerized data processing system. The method comprises the method steps of obtaining a workflow request having a plurality of device specific operations and credentials therefor; parsing the workflow request to locate at least one of said plurality of device specific operations and credentials therefor; and replacing the located at least one of said device specific operations and credentials therefor with an at least one logical device operation and credentials to create a generalized credential and protocol workflow.

In another embodiment of the invention, a computer program product is provided having a computer readable medium tangibly embodying computer readable program code for instructing a computer to perform generalized credential and protocol management of infrastructure in a computerized data processing system. The code includes retrieving means to obtain a workflow request having a plurality of device specific operations and credentials therefor; parsing means to parse said workflow request to locate at least one of the plurality of device specific operations and credentials therefor; and replacing means to replace the located at least one of the device specific operations and credentials therefor with an at least one logical device operation and credentials therefor to create a generalized credential and protocol neutral workflow.

In another embodiment of the invention, there is provided a signal bearing medium having a computer readable signal tangibly embodying computer readable program code for instructing a computer to perform generalized credential and protocol management of infrastructure in a computerized data processing system by providing retrieving means to obtain a workflow request having a plurality of device specific operations and credentials therefor; parsing means to parse the workflow request to locate at least one of the plurality of device specific operations and credentials therefor; and replacing means to replace the located at least one of the device specific operations and credentials therefor with an at least one logical device operation and credentials therefor to create a generalized credential and protocol workflow.

In another embodiment of the invention, there is provided a system for generalized credential and protocol management of infrastructure in a computerized data processing system, including an adapter and a processor programmed to obtain, via the adapter, a workflow request having a plurality of device specific operations and credentials therefor; parse the workflow request to locate at least one of the plurality of device specific operations and credentials therefor; and replace the located device specific operations and credentials therefor with at least one logical device operation and logical credentials therefor to create a generalized credential and protocol workflow.

In another embodiment of the invention, there is provided a system for generalized credential and protocol management of infrastructure in a computerized data processing system, including an adaptor and a processor programmed to obtain, via the adapter, a workflow request comprising a plurality of device specific operations and credentials therefor, where the credentials comprise at least one of a password and a user identifier (ID) associated with and used to separately authorize each of the plurality of device specific operations; parse the workflow request to locate at least one of the plurality of device specific operations and credentials therefor; create metadata comprising the at least one of the password and the user ID; create at least one logical device operation and logical credentials therefor associated with the located device specific operations and credentials therefor; associate the metadata with the logical credentials; and replace the located device specific operations and credentials therefor with the created at least one logical device operation and logical credentials therefor to create a generalized credential and protocol workflow.

In another embodiment of the invention, there is provided a computer program product comprising a computer readable medium tangibly embodying a computer readable program, where the computer readable program when executed on a computer causes the computer to obtain a workflow request comprising a plurality of device specific operations and credentials therefor, where the credentials comprise at least one of a password and a user identifier (ID) associated with and used to separately authorize each of the plurality of device specific operations; parse the workflow request to locate at least one of the plurality of device specific operations and credentials therefor; create metadata comprising the at least one of the password and the user ID; create at least one logical device operation and logical credentials therefor associated with the located device specific operations and credentials therefor; associate the metadata with the logical credentials; and replace the located device specific operations and credentials therefor with the created at least one logical device operation and logical credentials therefor to create a generalized credential and protocol workflow.

Other aspects and features of the present invention will become apparent to those of ordinary skill in the art upon review of the following description of specific embodiments of the invention in conjunction with the accompanying figures.

BRIEF DESCRIPTION OF THE SEVERAL VIEWS OF THE DRAWINGS

Preferred embodiments of the invention will now be described, by way of example, with reference to the accompanying drawings, in which.

Figure 1:
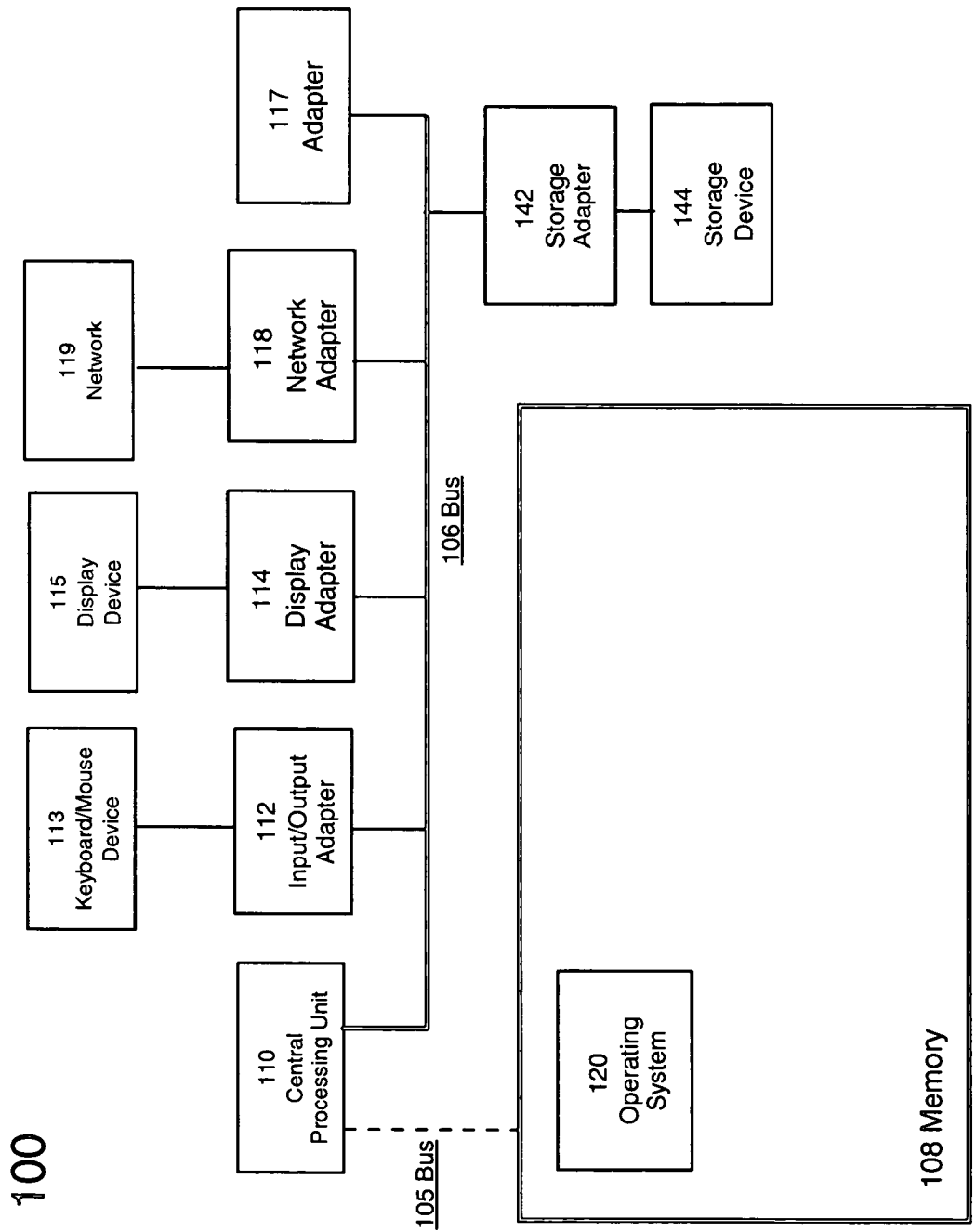
FIG. 1 is a hardware overview of a computer system, in support of an embodiment of the present invention.

Like reference numerals refer to corresponding components and steps throughout the drawings. It is to be expressly understood that the description and the drawings are only for the purpose of illustration and as an aid to understanding, and are not intended as a definition of the limits of the invention.

DETAILED DESCRIPTION

FIG. 1 depicts, in a simplified block diagram, a computer system 100 suitable for implementing embodiments of the present invention. Computer system 100 has processor 110, which is a programmable processor for executing programmed instructions stored in memory 108. Memory 108 can also include hard disk, tape or other storage media. While a single CPU is depicted in FIG. 1, it is understood that other forms of computer systems can be used to implement the invention. It is also appreciated that the present invention can be implemented in a distributed computing environment having a plurality of computers communicating via a suitable network 119.

CPU 110 is connected to memory 108 either through a dedicated system bus 105 and/or a general system bus 106. Memory 108 can be a random access semiconductor memory for storing application data for processing such as that in a database partition. Memory 108 is depicted conceptually as a single monolithic entity but it is well known that memory 108 can be arranged in a hierarchy of caches and other memory devices. FIG. 1 illustrates that operating system 120 may reside in memory 108.

Operating system 120 provides functions such as device interfaces, memory management, multiple task management, and the like as known in the art. CPU 110 can be suitably programmed to read, load, and execute instructions of operating system 120. Computer system 100 has the necessary subsystems and functional components to implement selective program tracing functions such as gathering trace records and historical data as will be discussed later. Other programs (not shown) include server software applications in which network adapter 118 interacts with the server software application to enable computer system 100 to function as a network server via network 119.

General system bus 106 supports transfer of data, commands, and other information between various subsystems of computer system 100. While shown in simplified form as a single bus, bus 106 can be structured as multiple buses arranged in hierarchical form. Display adapter 114 supports video display device 115, which is a cathode-ray tube display or a display based upon other suitable display technology. The Input/output adapter 112 supports devices suited for input and output, such as keyboard or mouse device 113, and a disk drive unit (not shown). Storage adapter 142 supports one or more data storage devices 144, which could include a magnetic hard disk drive or CD-ROM, although other types of data storage devices can be used, including removable media.

Adapter 117 is used for operationally connecting many types of peripheral computing devices to computer system 100 via bus 106, such as printers, bus adapters, and other computers using one or more protocols including Token Ring, LAN connections, as known in the art. Network adapter 118 provides a physical interface to a suitable network 119, such as the Internet. Network adapter 118 includes a modem that can be connected to a telephone line for accessing network 119. Computer system 100 can be connected to another network server via a local area network using an appropriate network protocol and the network server that can in turn be connected to the Internet. FIG. 1 is intended as an exemplary representation of computer system 100 by which embodiments of the present invention can be implemented. It is understood that in other computer systems, many variations in system configuration are possible in addition to those mentioned here.

Figure 2:
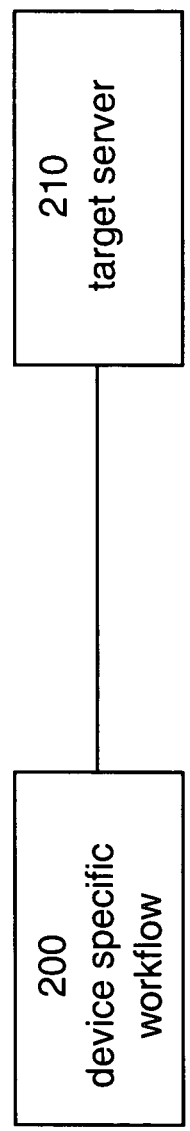
FIG. 2 is a block diagram relating a device specific workflow directed to a target device in the computer system of FIG. 1.

FIG. 2 is a block diagram relating a device specific workflow directed to a target device as shown in the computer system of previous FIG. 1. Device specific workflow 200 is a typical workflow containing commands as required for a specific type of device, wherein a device may be a combination of hardware and software (not limited to a physical device). The workflow is a series of operational requests using a format as dictated by the device upon which the action is to occur. Target device 210 is the target of the requested actions or operations contained in device specific workflow 200. Target device 210 may be a server, system or some other accessible object with which a requester desires to have some data initiated, changed, copied, or deleted. Connection between device specific workflow 200 and target device 210 is made by any suitable network means allowing communication as supported by both device specific workflow 200 and target device 210. Some workflows may require explicit use of specific protocols while others may allow use of any one protocol within a specified group. Some of the workflows may ignore the use of credentials while others may require explicit use.

Figure 3:
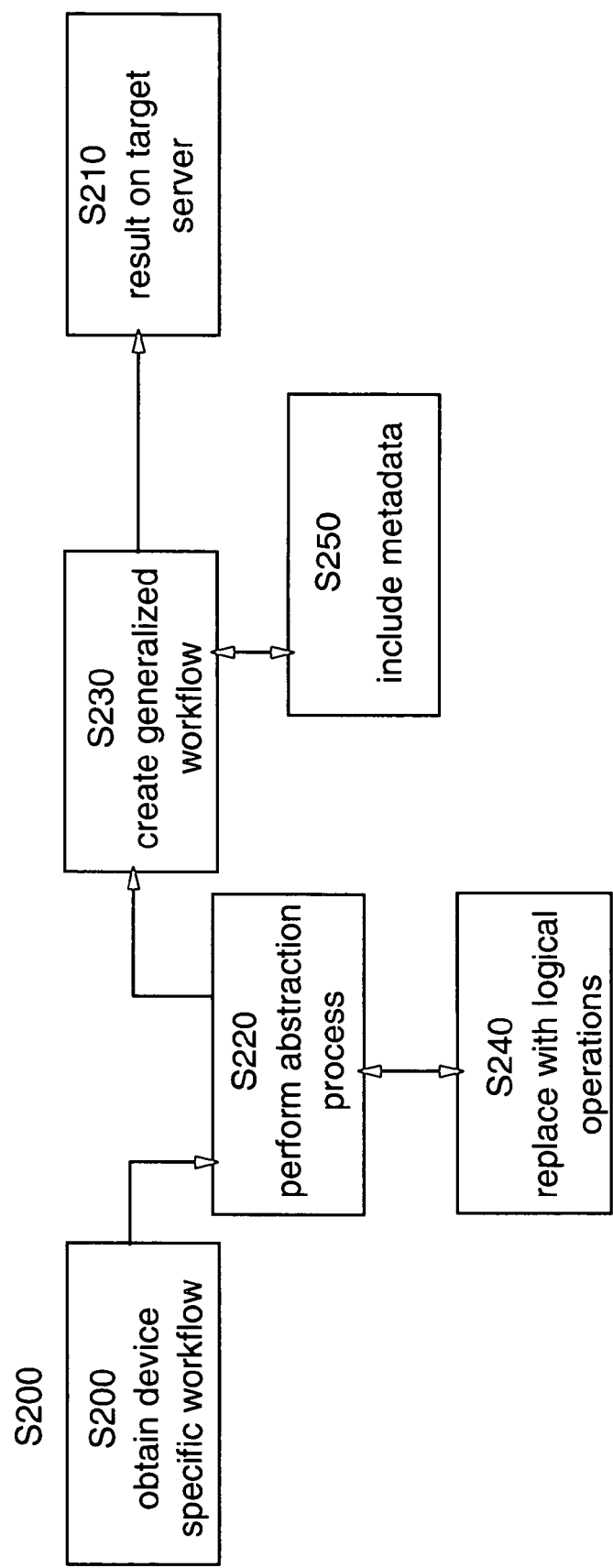
FIG. 3 is a block diagram relating the workflow and target device of FIG. 2 when modified using an embodiment of the present invention.

FIG. 3 is a block diagram relating the workflow and target device of FIG. 2 when modified using an embodiment of the present invention. Beginning with operation S200, device specific workflow 200 is obtained. This workflow is a typical device specific workflow containing a series of operations to be performed on a target device for which the workflow is directed. The workflow may be a series of commands such as those requesting a file be copied from one device to another or a set of installation commands to have a software stack installed on a remote server or other similar type of work. Moving to operation S220 a process of abstraction is performed. During operation S220, the device specific operations contained within device specific workflow 200 are removed and replaced with logical operations performing similar function but formatted in non-device specific terms. During operation S220, device specific operations are replaced one for one by logical operations recalled from a repository which may be in the form a simple table lookup or database. A parsing operation performed in operation S220 matches device specific operations with those of logical operations. During operation S240 the logical operations requested for matches of device specific requests encountered in device specific workflow 200 are retrieved and provided to operation S220.

Having performed operations S220 and S240 processing moves to operation S230 during which is created generalized workflow 230. Generalized workflow 230 contains no device specific operations. All physical operations unique to a specific device have been replaced by their logical equivalents. Operation S230 is typically a cleanup operation to ensure well-formed requests result from operations S220 and S240. During operation S230 generalized workflow 230 may be saved for future use or for immediate use in operation S250.

During operation S250 metadata is combined with output of operation S230, the generalized workflow, so that the modified workflow may then be directed at a specific device. Credentials such as user ID and password are among data contained within the metadata repository. Protocol information is also provided by a service access points (SAP) indicating desired service and a device type of the target device. One means of providing this information may be in the form of parameterized administrator commands including values indicating service access points (SAPs) and a user ID/password combination. Requests are processed under authorization of the specified user ID. Collections of user IDs and associated passwords may be maintained to minimize compromising the sensitive information allowing differing collections for different environments. In this case if one collection if compromised the other environments are not immediately at risk.

FIG. 4a through FIG. 4d are a series of block diagrams showing in progression an example of adding a server using an embodiment of the present invention of FIG. 3.

Figure 4A:
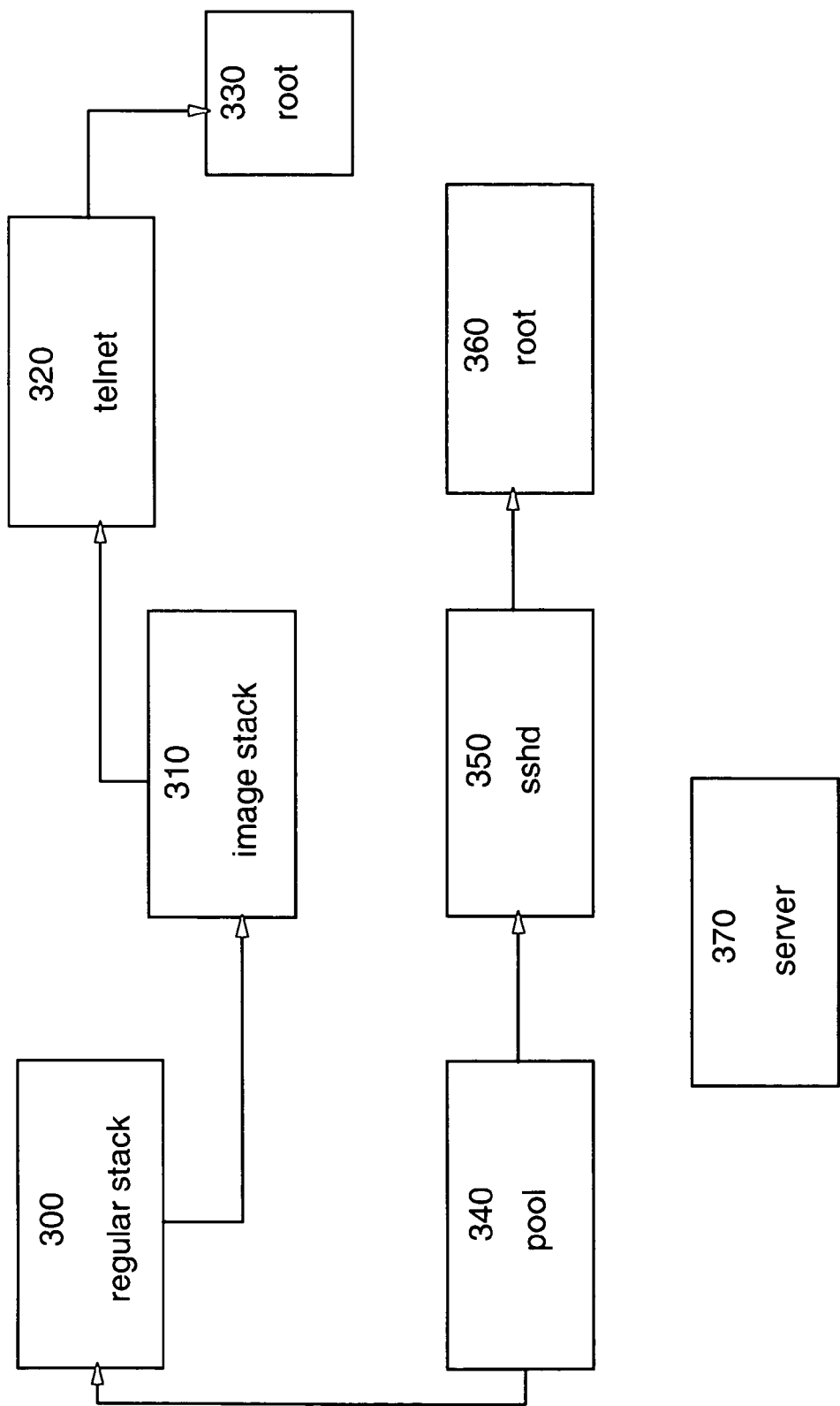
FIG. 4a through FIG. 4d are a series of block diagrams showing in progression an example of adding a server using an embodiment of the present invention of FIG. 3.

FIG. 4a depicts pool 340 with software regular stack 300 installed. Further image stack 310 defines telnet SAP 320 with root 360 credentials. Pool 340 has its own SAP specified as (secure shell daemon) sshd 350 with associated root 360 credentials. Server 370 is shown as isolated and not yet part of the operational environment.

Figure 4B:
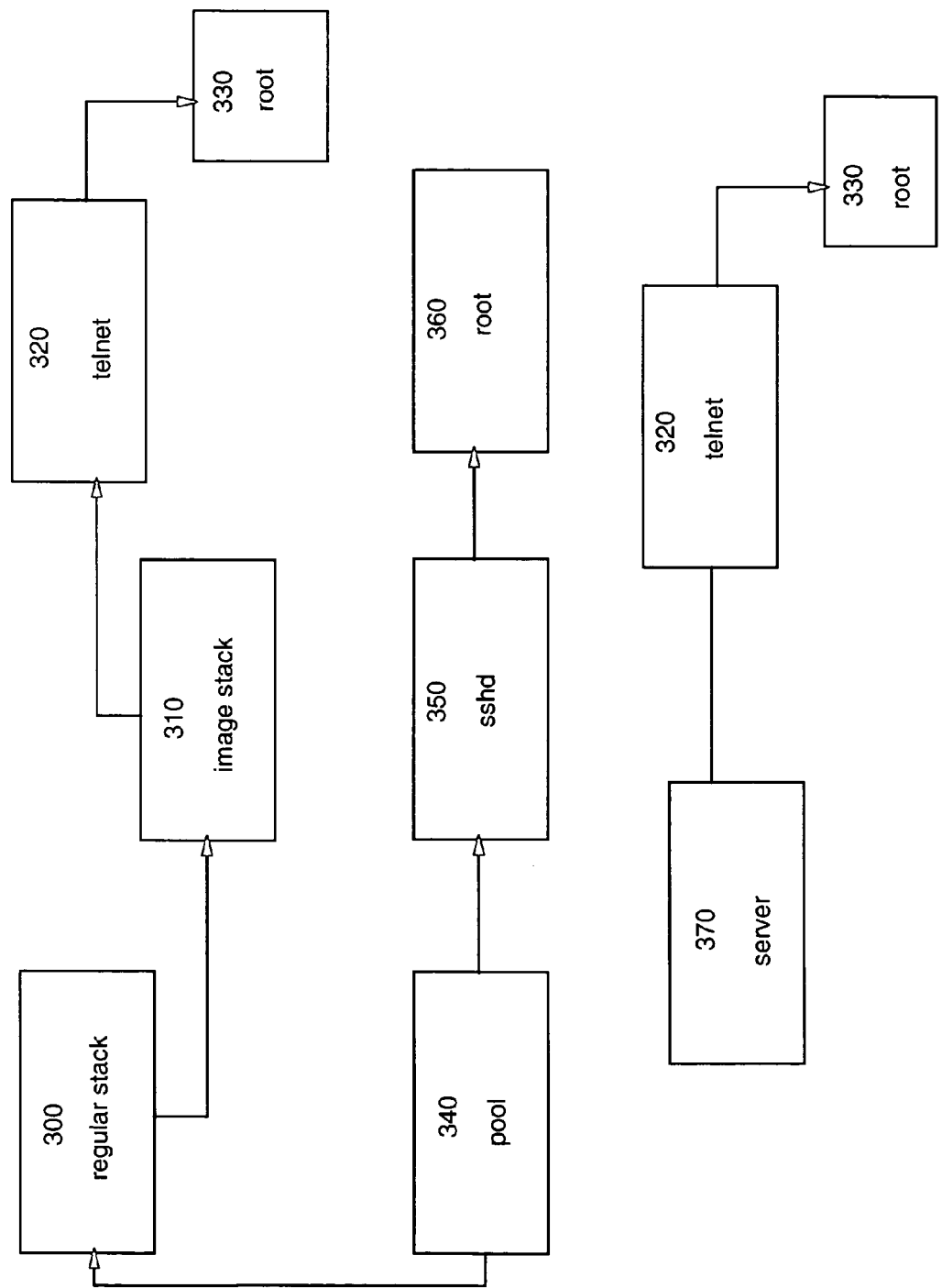

FIG. 4b shows a similar arrangement for the components of FIG. 4a, but now server 370 has been initialized and software installed from regular stack 300 and image stack 310 defining at server 370 level telnet SAP 320 with root 360 credentials. All SAPs and credentials were defined for image stack 310 and have been copied over to server 370 as a result of the software installation process. Any subsequent workflow will now be able to leverage the credentials defined by image stack 310. A subsequent software installation process will use the SAPs and credentials defined by image stack 310.

Figure 4C:
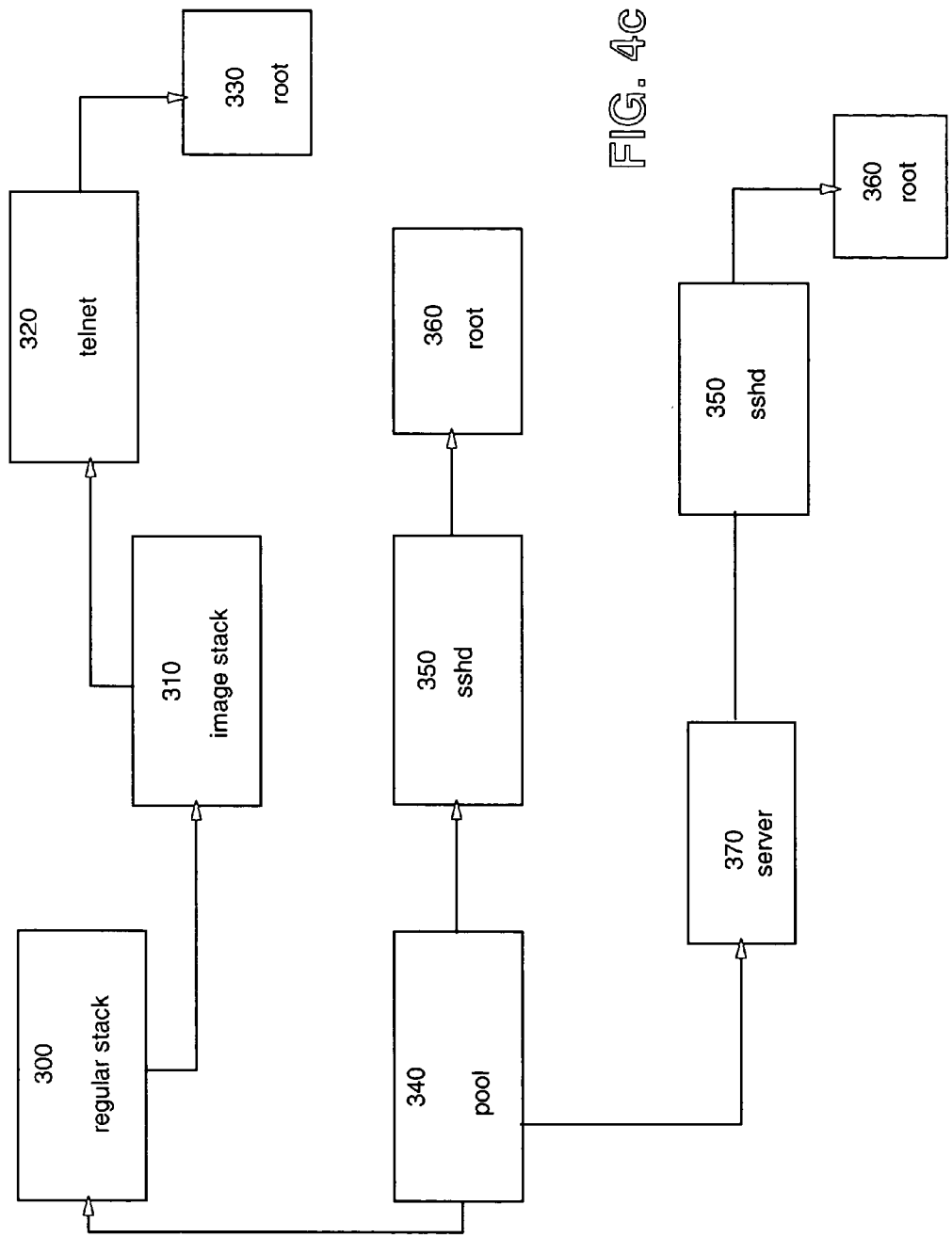

FIG. 4c shows server 370 as having regular stack 300 and image stack 310 installed and having applied pool 340 credentials of root 360 and sshd SAP 350. Server 370 is now part of pool 340. The process of applying pool 340 credentials and SAPs invalidates those applied by image stack 310. Each server 370 found in pool 340 will have the same SAPs and credentials for easier management. Pool 340 may be viewed as a container containing similar objects, those being server 370 like. This approach will not work for software as in regular stack 300 and image stack 310 as the software may vary from cluster to cluster. In addition software installation tends to be cumulative so credential specification must be absolute (as in FIG. 1 case) and specific to the cluster.

Figure 4D:
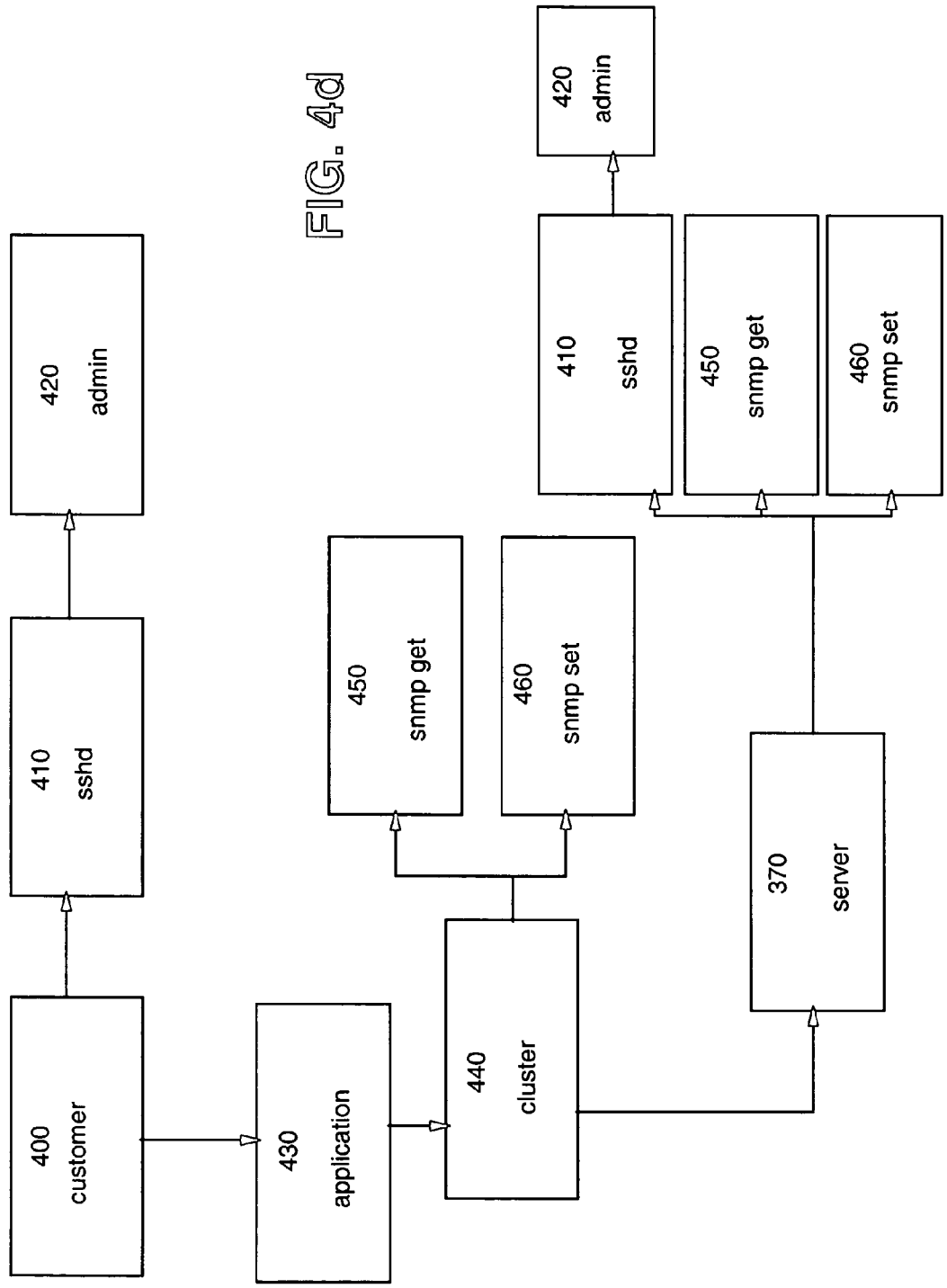

FIG. 4d shows server 370 as being moved to cluster 440 by invoking a cluster add server logical operation. As shown server 370 has now had applied the SAPs ((simple network management protocol) snmp get and snmp set) of cluster 440 and customer 400 objects as well as credentials of admin 420. This process occurs when a workflow is used to perform a logical cluster add server operation which takes a server from a pool and adds it to a cluster. In this case the new server will receive new SAPs and credentials defined by the target environment (the cluster). The new SAPs and credentials will be a combination of customer, application and cluster objects.

Throughout the example the administrator (either manually or programmatically) has provided metadata that acted as the specification for the SAPs and the credentials in use for pool 340 and server 370. Credentials 360 as shown in FIG. 4d may be specified at the customer 400, application 430 as well as cluster 440 levels. This provides greater flexibility and easier administration. For example the administrator may choose to apply the same credentials across customer 400. This would allow one set of credentials to be used rather than having to specify one set of credentials per cluster 440. As seen in FIG. 4d, when server 370 was initialized pool 340, SAP of telnet 320 was used, but when server 370 became part of cluster (in a customer environment) server 370 was managed through SAP sshd 350 and credential 360. This allows an administrator to manage resources differently in different environments. Treating customer environment differently is relatively easy as well by using a different local user to access each different customer environment. This provides a way to have a different password and public key combination for each environment. If one customer environment is attacked by hackers, the other customer environments will be safe. Public keys and passwords are kept separately and passwords are typically encrypted to add to cross domain security.

Figure 5:
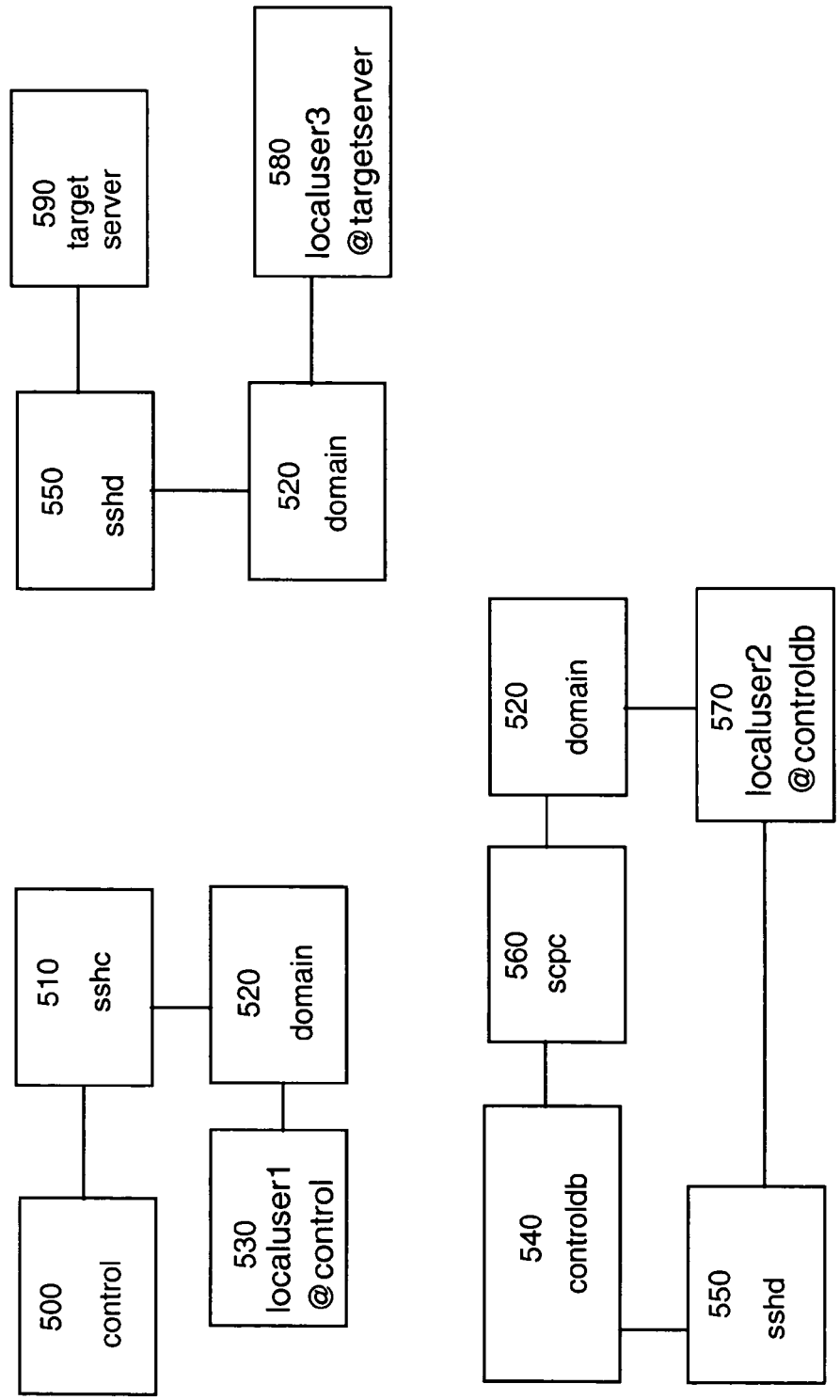
FIG. 5 is a block diagram depicting a cross-domain example of an embodiment of the present invention.

FIG. 5 is a block diagram depicting a multi-domain example of an embodiment of the present invention. Three servers are shown, control 500, controldb 540 and target server 590. To execute a command on target server 590, control 500 will use SAP (secure shell client) sshc 510 to access SAP sshd 550 of target server 590 using common domain 520. When accessing target server 590, control 500 will use localuser1@control 530 while on target server 590 all commands received will be executed by localuser3@targetserver 580. If additional security is required in the form of public key—private key combinations then localuser1@control 530 public key should be maintained in localuser3@targetserver 580 authorized keys file.

When copying a file from controldb 540 to target server 590, control 500 will use its SAP sshc 510 to execute a command on controldb 540 using its SAP (service control point client) scpc 560. The command when executed will cause SAP scpc 560 to be invoked to call SAP sshd 550 on target server 590. As before if additional security is required in the form of public key—private key combinations then localuser2@controldb 540 public key should be maintained in localuser3@targetserver 580 authorized keys file.

Although the invention has been described with reference to illustrative embodiments, it is to be understood that the invention is not limited to these precise embodiments and that various changes and modifications may be effected therein by one skilled in the art. All such changes and modifications are intended to be encompassed in the appended claims.

What is claimed is:

1. A system for generalized credential and protocol management of infrastructure in a computerized data processing system, comprising:
   an adapter; and
   a processor programmed to:
      obtain, via the adapter, a workflow request having a plurality of device specific operations and credentials therefor;
      parse the workflow request to locate at least one of the plurality of device specific operations and credentials therefor; and
      replace the located device specific operations and credentials therefor with at least one logical device operation and logical credentials therefor to create a generalized credential and protocol workflow.

2. The system of claim 1, where, in being programmed to replace the located device specific operations and credentials therefor with at least one logical device operation and logical credentials therefor to create the generalized credential and protocol workflow, the processor is programmed to match each of the located device specific operations with a corresponding equivalent logical device operation.

3. The system of claim 2, where, in being programmed to match each of the located device specific operations with the corresponding equivalent logical device operation, the processor is programmed to use at least one of a lookup table and a database.

4. The system of claim 2, where, in being programmed to replace the located device specific operations and credentials therefor with at least one logical device operation and logical credentials therefor to create the generalized credential and protocol workflow, the processor is programmed to:
   combine the generalized credential and protocol workflow with metadata to resolve the logical device operation and logical credentials therefor into a modified workflow request; and
   execute the modified workflow request.

5. A system for generalized credential and protocol management of infrastructure in a computerized data processing system, comprising:
   an adapter; and
   a processor programmed to:
      obtain, via the adapter, a workflow request comprising a plurality of device specific operations and credentials therefor, where the credentials comprise at least one of a password and a user identifier (ID) associated with and used to separately authorize each of the plurality of device specific operations;
      parse the workflow request to locate at least one of the plurality of device specific operations and credentials therefor;
      create metadata comprising the at least one of the password and the user ID;
      create at least one logical device operation and logical credentials therefor associated with the located device specific operations and credentials therefor;
      associate the metadata with the logical credentials; and
      replace the located device specific operations and credentials therefor with the created at least one logical device operation and logical credentials therefor to create a generalized credential and protocol workflow.

6. The system of claim 5, where, in being programmed to replace the located device specific operations and credentials therefor with the created at least one logical device operation and logical credentials therefor to create the generalized credential and protocol workflow, the processor is programmed to match each of the located device specific operations with a corresponding equivalent logical device operation.

7. The system of claim 6, where, in being programmed to match each of the located device specific operations with the corresponding equivalent logical device operation, the processor is programmed to use at least one of a lookup table and a database.

8. The system of claim 6, where, in being programmed to replace the located device specific operations and credentials therefor with the created at least one logical device operation and logical credentials therefor to create the generalized credential and protocol workflow, the processor is programmed to:
  combine the generalized credential and protocol workflow with the metadata to resolve the logical device operation and logical credentials therefor into a modified workflow request; and
  execute the modified workflow request.

9. A computer program product comprising a computer readable storage device tangibly embodying a computer readable program, where the computer readable program when executed on a computer causes the computer to:
  obtain a workflow request comprising a plurality of device specific operations and credentials therefor, where the credentials comprise at least one of a password and a user identifier (ID) associated with and used to separately authorize each of the plurality of device specific operations;
  parse the workflow request to locate at least one of the plurality of device specific operations and credentials therefor;
  create metadata comprising the at least one of the password and the user ID;
  create at least one logical device operation and logical credentials therefor associated with the located device specific operations and credentials therefor;
  associate the metadata with the logical credentials; and
  replace the located device specific operations and credentials therefor with the created at least one logical device operation and logical credentials therefor to create a generalized credential and protocol workflow.

10. The computer program product of claim 9, where, in causing the computer to replace the located device specific operations and credentials therefor with the created at least one logical device operation and logical credentials therefor to create the generalized credential and protocol workflow, the computer readable program when executed on the computer causes the computer to match each of the located device specific operations with a corresponding equivalent logical device operation.

11. The computer program product of claim 10, where, in causing the computer to match each of the located device specific operations with the corresponding equivalent logical device operation, the computer readable program when executed on the computer causes the computer to use at least one of a lookup table and a database.

12. The computer program product of claim 10, where, in causing the computer to replace the located device specific operations and credentials therefor with the created at least one logical device operation and logical credentials therefor to create the generalized credential and protocol workflow, the computer readable program when executed on the computer causes the computer to:
  combine the generalized credential and protocol workflow with the metadata to resolve the logical device operation and logical credentials therefor into a modified workflow request; and
  execute the modified workflow request.

* * * * *